(12) United States Patent
Lin et al.

(10) Patent No.: US 9,331,522 B2
(45) Date of Patent: May 3, 2016

(54) BACKUP POWER SUPPLYING DEVICE HAVING PROGRAMMABLE CURRENT-BALANCING CONTROL

(71) Applicant: ETASIS ELECTRONICS CORPORATION, New Taipei (TW)

(72) Inventors: Yu-Hung Lin, New Taipei (TW); Hsin-Hung Chen, New Taipei (TW)

(73) Assignee: Etasis Electronics Corporation, New Taipei (TW)

( * ) Notice: Subject to any disclaimer, the term of this patent is extended or adjusted under 35 U.S.C. 154(b) by 441 days.

(21) Appl. No.: 14/013,221

(22) Filed: Aug. 29, 2013

(65) Prior Publication Data
US 2015/0061394 A1    Mar. 5, 2015

(51) Int. Cl.
*H02H 1/00* (2006.01)
*H02J 9/00* (2006.01)
*H01H 1/00* (2006.01)
*H02J 1/10* (2006.01)

(52) U.S. Cl.
CPC ........ *H02J 9/005* (2013.01); *H01H 1/00* (2013.01); *H02H 1/00* (2013.01); *H02J 1/102* (2013.01); *Y10T 307/615* (2015.04)

(58) Field of Classification Search
CPC .................................................. H02H 1/00
USPC ............................................................. 307/64
See application file for complete search history.

(56) References Cited

U.S. PATENT DOCUMENTS

| | | | | |
|---|---|---|---|---|
| 4,860,188 A * | 8/1989 | Bailey | ........................ | G05F 1/59 307/82 |
| 5,319,536 A * | 6/1994 | Malik | ........................ | H02J 1/102 307/82 |
| 6,462,926 B1 * | 10/2002 | Zaretsky | ................... | H02J 1/10 361/103 |
| 6,958,552 B2 * | 10/2005 | Dodson, III | ............. | H02J 1/108 307/52 |
| 7,355,829 B2 * | 4/2008 | Yamamura | ................. | H02J 1/10 361/91.1 |
| 7,466,573 B2 * | 12/2008 | Kojori | ........................ | H02J 1/10 323/271 |
| 8,546,977 B2 * | 10/2013 | Togare | ..................... | H02J 1/102 307/112 |
| 8,730,695 B1 * | 5/2014 | Ludlam | ................ | H02M 3/1584 363/65 |
| 8,854,848 B1 * | 10/2014 | Chen | .................... | H02M 3/1584 323/283 |
| 2008/0164759 A1 * | 7/2008 | Sharma | ...................... | H02J 1/10 307/52 |
| 2008/0266740 A1 * | 10/2008 | Smith | ........................ | H02J 1/10 361/91.5 |
| 2010/0277000 A1 * | 11/2010 | Humphrey | .............. | H02J 1/102 307/80 |

\* cited by examiner

*Primary Examiner* — Adi Amrany
(74) *Attorney, Agent, or Firm* — Rosenberg, Klein & Lee

(57) ABSTRACT

A backup power supplying device having programmable current-balancing control includes at least two power modules connected in parallel. The power module includes a power converter, a current sensing component, a potential tuner, a microprocessor, a current-balancing control circuit and an output voltage controller. The current sensing component senses an output current of the power converter to generate a current sensing signal. The microprocessor controls the potential tuner to generate a tuning signal, and receives a mode signal to control the power module to operate in a power supply or sleep mode. The current-balancing control circuit receives the current sensing signal, the tuning signal and the mode signal. When the power module operates in the sleep mode, an output voltage of the power converter is a sleep voltage; a voltage level of the sleep voltage is lower than a voltage level of a supply voltage by a predetermined voltage value.

10 Claims, 8 Drawing Sheets

US 9,331,522 B2

BACKUP POWER SUPPLYING DEVICE HAVING PROGRAMMABLE CURRENT-BALANCING CONTROL

BACKGROUND

1. Technical Field

The present disclosure relates to a power supplying device, in particular, to a backup power supplying device having programmable current-balancing control.

2. Description of Related Art

Referring to FIG. 1A, FIG. 1A is a schematic diagram illustrating a conventional backup power supplying device. The backup power supplying device 1 includes more than two power modules. Taking FIG. 1A as an example of two power modules, a first power muddle 11 and a second power module 12 jointly share the output power to a load, so that when any one of the power modules is interrupted abnormally, the other power module which can operate normally may keep providing power to the load to meet the demand for uninterruptible power supply.

The backup power supplying device described as above could be in a current-balancing control state. The demand for the input power of the power supply terminal when the two power modules supply power concurrently is higher than that when only one power module is at work. Therefore, there two applications are derived. In the first application, one power module (e.g., the second power module 12) stays in a sleep mode in order to reduce power consumption. When another power module (e.g., the first power module 11) is broken, the power module staying in the sleep mode (e.g., the second power module 12) can be started to output power to the load. In the second application, the input terminal of one power module (e.g., the second power module 12) is changed to connect to a battery, in order to avoid the load failing to continue operating when the mains AC is interrupted. It is worth mentioning that when an abnormality occurs on the first power module 11, the first power module 11 can transmit an error signal PR to the second power module 12 so that the second power module 12 can be switched to a power supply mode accordingly. The two above-mentioned applications both are making the power source enter the sleep mode when the power module is in an off state. When an abnormality occurs on the power module which supplies power originally or the input power of the power module is interrupted, a problem of interruption instantaneously and restart on the output voltage will occur. At this time, it will cause the power interruption and restart on the system (or load), causing the system administrator must reset the system settings, resulting in the system operating cost increases. The following description of FIG. 1B is a clear example.

Referring to both FIG. 1A and FIG. 1B, FIG. 1B is an output voltage waveform diagram of a backup power supplying device 1 shown in FIG. 1A when an output voltage interruption occurs. The input voltage of the backup power supplying device 1 can be mains (AC), DC, or any type of input voltage. The present disclosure is not limited to the type of the input voltage and the voltage value. When an interruption occurs on a first input voltage of the first power module 11 and the voltage level is reduced to zero volts as shown in FIG. 1B, a first output voltage of the first power module 11 then drops to zero volts. The second power module 12 can receive the error signal PR from the first power module 11 to generate a second output voltage to supply power. It is worth mentioning that the second input voltage of the second power module 12 is always maintained without interruption. There will be a time for system interruption and restart on the voltage change, which is obtained from the total output terminal of the first power module 11 and the second power module 12 connected in parallel.

SUMMARY

An exemplary embodiment of the present disclosure provides a backup power supplying device having programmable current-balancing control, which can achieve the goal of zero time switching when any power module is interrupted so as not to affect the normal work of the load.

In an exemplary embodiment of the present disclosure, the above mentioned backup power supplying device having programmable current-balancing control comprises at least two power modules. The power modules connected in parallel output power to a load. Each of the power modules operates in a power supply mode or a sleep mode. Each of the power modules comprises a power converter, a current sensing component, a potential tuner, a microprocessor, a current-balancing control circuit and an output voltage controller. The power converter has an output end; the power converter provides power to the load via the output end. The current sensing component is coupled to the output end of the power converter; the current sensing component senses an output current of the power converter to generate a current sensing signal. The potential tuner generates a tuning signal. The microprocessor is coupled to the potential tuner; the microprocessor controls the potential tuner to generate the tuning signal; the microprocessor receives a mode signal to controls the power module to operate in the power supply mode or the sleep mode. The current-balancing control circuit is coupled to the current sensing component and the potential tuner, and receives the current sensing signal, the tuning signal and the mode signal. The current-balancing control circuit generates a current-balancing signal according to the current sensing signal when the current-balancing control circuit does not receive the tuning signal; the current-balancing control circuit generates a voltage-control signal according to the tuning signal when the current-balancing control circuit receives the tuning signal. The output voltage controller is coupled to the current-balancing control circuit. The output voltage controller tunes an output voltage of the power converter to a supply voltage according to the current-balancing signal or the voltage control signal when the power module operates in the power supply mode. The current-balancing control circuit controls the output voltage of the power converter to a sleep voltage according to the mode signal via the output voltage controller when the power module operates in the sleep supply mode; a voltage level of the sleep voltage is lower than a voltage level of the supply voltage by a predetermined voltage value. The current-balancing control circuit of each power module is coupled to each other via a current-balancing communicating wire; the microprocessor of each power module is coupled to each other via a backup-mode communicating wire.

In an exemplary embodiment of the present disclosure, the mode signal received by the microprocessor is a control command from a communication port or an error signal from the backup-mode communicating wire.

In an exemplary embodiment of the present disclosure, the power module further comprises a voltage determining component, which is coupled to an input power source and the microprocessor; the input power source is the source to be provided to the power converter to convert power; the voltage determining component generates the mode signal according to the input power source.

In an exemplary embodiment of the present disclosure, the input power source is an AC power source or a DC power source, the power module is an AC/DC power module or a DC/DC power module.

In an exemplary embodiment of the present disclosure, the input power source is from a battery.

In an exemplary embodiment of the present disclosure, the communication port is an Inter-Integrated Circuit Bus ($I^2C$-Bus) or a Power Management Bus (PMBus).

In an exemplary embodiment of the present disclosure, the backup power supplying device having programmable current-balancing control further comprises a switch, which is coupled between the current sensing component and the load.

In an exemplary embodiment of the present disclosure, the output voltage controller is a pulse width modulation controller or a linear voltage modulation controller.

In an exemplary embodiment of the present disclosure, the potential tuner comprises a variable resistance component.

In an exemplary embodiment of the present disclosure, the load ratio of the power modules is tunable.

To sum up, the exemplary embodiment of the present disclosure provides a backup power supplying device having programmable current-balancing control, which controls the power module to operate in the power supply mode or a sleep mode via the mode signal received via the processor. The voltage level of the sleep voltage is lower than the voltage level of the supply voltage by a predetermined voltage value. The predetermined voltage value could be set within a voltage difference range of a tolerable working voltage for the load, by which the sleep voltage of the power module which is in the sleep mode will not interrupt the work of the load when the power module is abnormal. In addition, by means of the tuning mechanism of the current-balancing control circuit, the output voltage of the power module which is in the sleep mode will rapidly increase from the sleep voltage to the normal power supply voltage.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
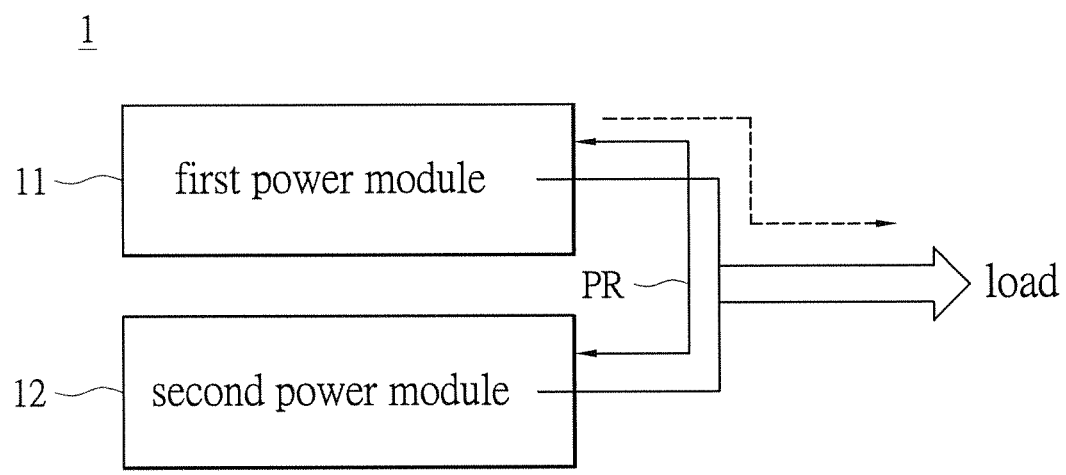
FIG. 1A is a schematic diagram illustrating a conventional backup power supplying device.
Figure 1B:
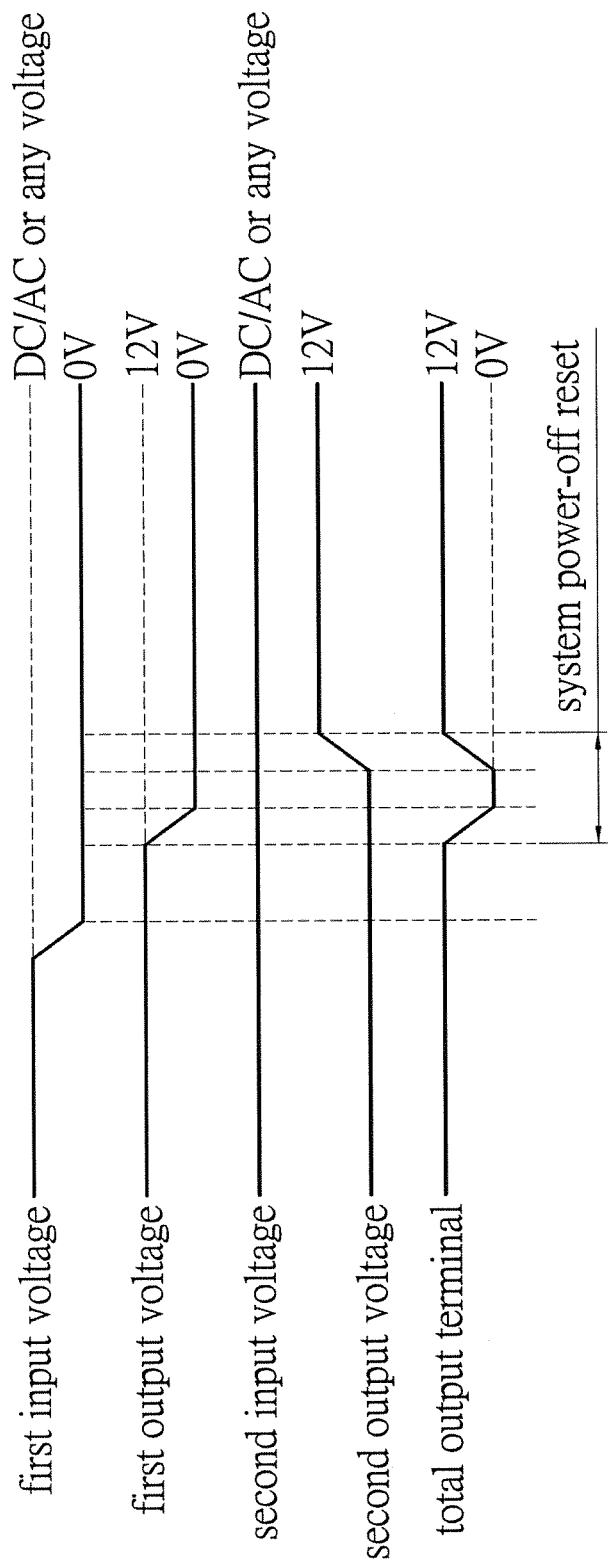
FIG. 1B is an output voltage waveform diagram of a backup power supplying device when an output voltage interruption occurs.
Figure 2A:
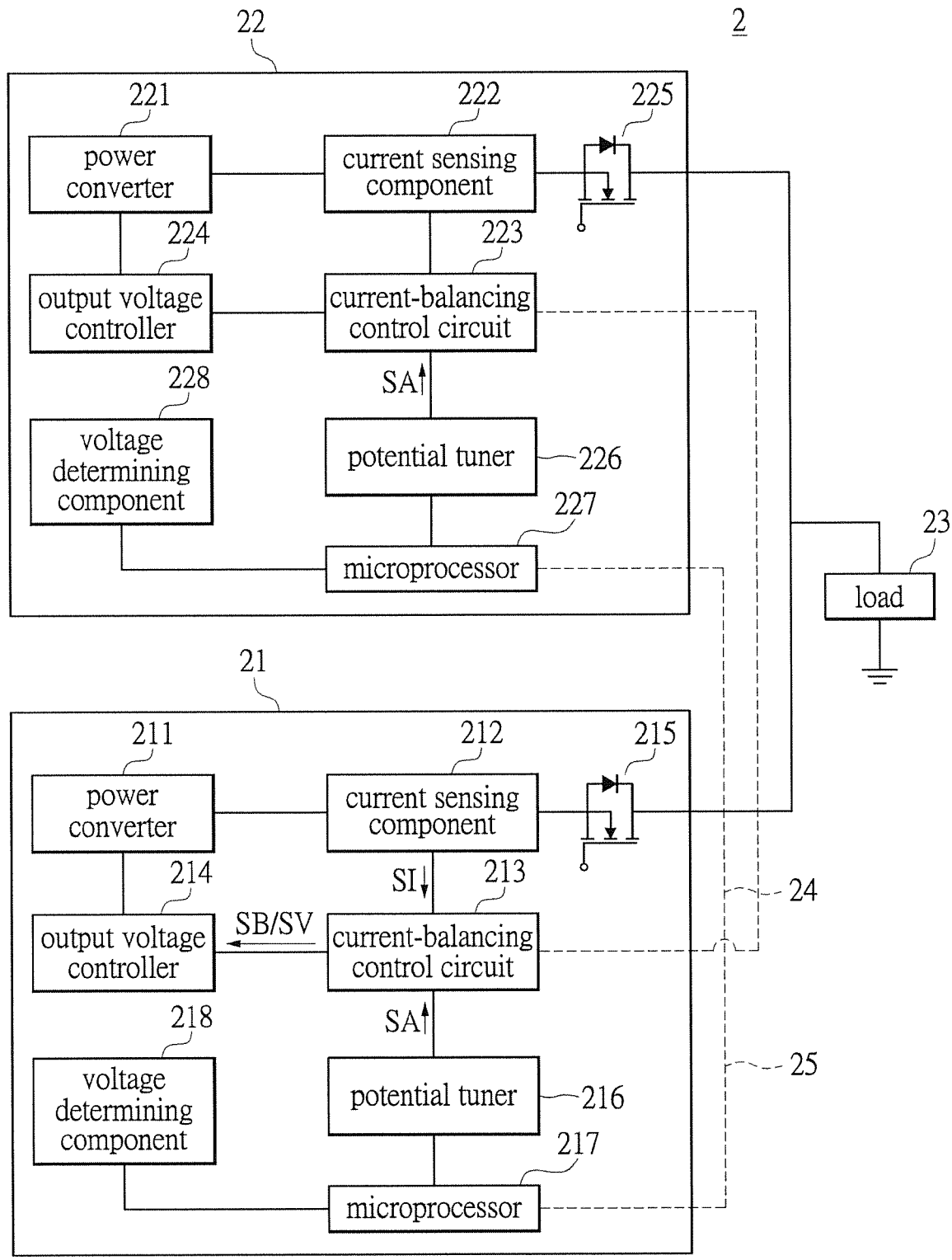
FIG. 2A is a circuit block diagram illustrating a backup power supplying device having programmable current-balancing control in an embodiment of the present disclosure.

An exemplary embodiment of a backup power supplying device having programmable current-balancing control Referring to FIG. 2A, FIG. 2A is a circuit block diagram illustrating a backup power supplying device having programmable current-balancing control in an embodiment of the present disclosure. The backup power supplying device having programmable current-balancing control 2 comprises at least two power modules connected in parallel. In FIG. 2A, two power modules 21 and 22 are taken as an example for illustration. The load ratio of the power modules 21 and 22 is tunable. The power modules 21 and 22 connected in parallel with each other output power to a load 23, and each of the power modules 21 and 22 can operate in a power supply mode or a sleep mode. The power module 21 comprises a power converter 211, a current sensing component 212, a current-balancing control circuit 213, an output voltage controller 214, a switch 215, a potential tuner 216, a microprocessor 217 and a voltage determining component 218. The power module 22 comprises a power converter 221, a current sensing component 222, a current-balancing control circuit 223, an output voltage controller 224, a switch 225, a potential tuner 226, a microprocessor 227 and a voltage determining component 228.

The power converter 211 (or 221) has an output end. The power converter 211 (or 221) provides power to the load 23 via the output end. The current sensing component 212 (or 222) is coupled to the output end of the power converter 211 (or 221). The current sensing component 212 (or 222) senses the output current of the power converter 211 (or 221) to generate a current sensing signal SI. The switch 215 (or 225) is coupled between the current sensing component 212 (or 222) and the load 23.

The potential tuner 216 (or 226) generates a tuning signal SA. The microprocessor 217 (or 227) is coupled to the potential tuner 216 (or 226). The microprocessor 217 (or 227) controls the potential tuner 216 (or 226) to generate the tuning signal SA. The processor 217 (or 227) receives a mode signal (the mode signal can be from a variety of sources, not illustrated here) to control the power module 21 (or 22) to operate in the power supply mode or the sleep mode. The processor 217 (or 227) can have a communication port, and make the potential tuner 216 (or 226) generate the tuning signal SA according to a control command from the communication port.

The current-balancing control circuit 213 (or 223) is coupled to the current sensing component 212 (or 222) and the potential tuner 216 (or 226), and receives the current sensing signal SI, the tuning signal SA and the mode signal. The output voltage controller 214 (or 224) is coupled to the current-balancing control circuit 213 (or 223) and the power converter 211 (or 221). The voltage determining component 218 (or 228) is coupled to an input power source and the processor 217 (or 227). The input power source is the source to be provided to the power converter 211 (or 221) to convert power. The voltage determining component 218 (or 228) generates the mode signal according to the input power source. The input power source can be an AC power source or a DC power source, and the power module can be an AC/DC power module or a DC/DC power module. The input power source can be from a battery The operation of the current-balancing control circuit 213 is taken as an example for illustration below. The current-balancing control circuit 223 is substantially identical to the current-balancing control circuit 213 in operation and thus will not be repeatedly described hereinafter. When the current-balancing control circuit 213 does not receive the tuning signal SA, the current-balancing control circuit 213 generates a current-balancing signal SB according to the current sensing signal SI. When the current-balancing control circuit 213 receives the tuning signal SA, the current-balancing control circuit 213 generates a voltage control signal SV according to the tuning signal SA. The output voltage controller 214 tunes an output voltage of the power converter 211 according to the current-balancing signal SB or the voltage control signal SV. The current-balancing control circuits (213, 223) of the power modules (21, 22) are coupled with each other via a current-balancing communicating wire 24. The microprocessors (217, 227) of the power modules (21, 22) are coupled with each other via a backup-mode communicating wire 25. The mode signal received by the microprocessors 217 and 227 can be the control command from the communication port or an error signal from the backup-mode communicating wire 25. According to above mentioned description, the mode signal received by the microprocessors 217 and 227 has at least three sources, including the voltage determining component (218, 228), the communication port and the backup-mode communicating wire 25.

When the power module 21 (or 22) operates in the power supply mode, the output voltage controller 214 (or 224) tunes the output voltage of the power converter to a supply voltage according to the current-balancing signal SB or the voltage control signal SV. When the power module 21 (or 22) operates in the sleep mode, the current-balancing control circuit 213 (or 223) controls the output voltage of the power converter 211 (or 221) to a sleep voltage according to the mode signal via the output voltage controller 214 (or 224). The voltage level of the sleep voltage is lower than the voltage level of the supply voltage by a predetermined voltage value. The difference between the sleep voltage and the power supply voltage (the predetermined voltage value) will be further described below.

Re-referring to FIG. 2A, the mode signal received by the microprocessor 217 and 227 can be the control command from the communication port. The control signaling can be a digital communication signal from external computer or controller. The digital communication signal can be received from the communication port such as an Inter-Integrated Circuit Bus (I²C-Bus) or a Power Management Bus (PMBus). However, the communication port of the microprocessor 217 and 227 for receiving digital communication and the format of the control signaling or the signal standard, in the present disclosure, are not limited by what has been shown and described hereinabove.

Based on the control programmable current-balancing control, there are two applications to implement the backup power supply mode. One application is sending the control command to the microprocessor of any of power module via a digital communication bus at the system side to notify the power module to enter the sleep mode (reducing the output voltage). Another application is utilizing the microprocessor to identify the voltage specification and making the power module to enter the sleep mode automatically. The output voltage level of the power module is tuned by the microprocessor controlling the potential tuner and the active type current-balancing control circuit. Thus, when an abnormality of interruption occurs, the abnormal or interrupted power module will send the error signal to the power module which is originally in the sleep mode via the backup-mode signal bus, in order to notify the power module to enter the power supply mode. In this case, the active type current-balancing control circuit will detect that the voltage at the current-balancing communication wire (e.g., current-balancing bus) of the abnormal or interrupted power module drops to zero. At this time, according to the hardware action principle of the current-balancing control circuit, the current-balancing control circuit can actively increase the voltage to a suitable voltage level (e.g., a normal power supply voltage) so as to continue to supply the power to the load, in order to achieve "zero" time switching purposes.

Figure 2B:
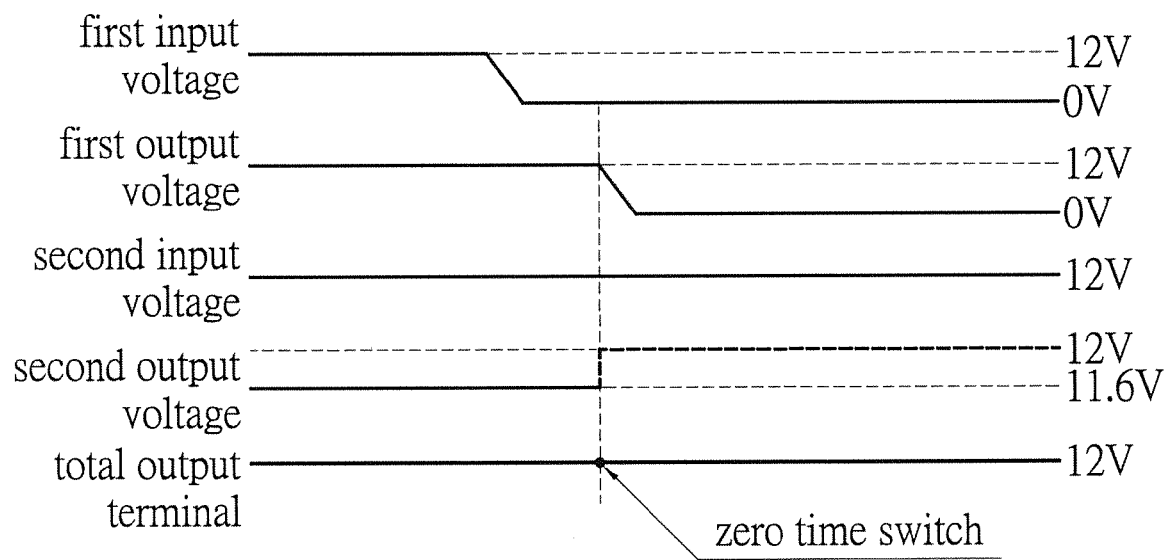
FIG. 2B is an output voltage waveform diagram of a backup power supplying device having programmable current-balancing control when an output voltage interruption occurs in an embodiment of the present disclosure.

Referring to FIG. 2A and FIG. 2B, FIG. 2B is an output voltage waveform diagram of a backup power supplying device having programmable current-balancing control when an output voltage interruption occurs in an embodiment of the present disclosure. It is worth mentioning that the input voltage can be mains (AC), DC, or any type of input voltage. A 12V input voltage is taken as an example for illustration here. When the first input voltage of the power module 21 is interrupted (or drops to zero volts), the first output voltage of the power module 21 will then drop to zero volts. The microprocessor 217 of the power module 21 will transmit the error signal to the microprocessor 227 of the power module 22 via backup-mode communicating wire 25. The second output voltage of the power module will switch from the sleep voltage to the power supply voltage. In the present embodiment, the normal supply voltage of the power modules 21 and 22 is 12V and the sleep voltage of the power modules 21 and 22 is 11.6V. The voltage level of the sleep voltage is lower than the voltage level of the supply voltage by 0.4V predetermined voltage value. With regard to the load 23 which generally works at 12V, the 11.6V voltage can still allow the load 23 to operate normally and will not cause occurrence of the interruption or restart. Therefore, as for the load 23, during the procedure that the output voltage of the power module 22 switches from the sleep voltage (11.6V) to the supply voltage (12V) due to the interruption of the power module 21, the voltage conversion will not impact on the load 23. In other words, in the light of the supply voltage provided by the power modules 21, 22 and the working feature of the load 23, the load 23 has a tolerable working voltage range (or a minimum tolerance for the working voltage) allowing the user or system administrator to set a tolerable sleep voltage for the load 23.

Figure 3:
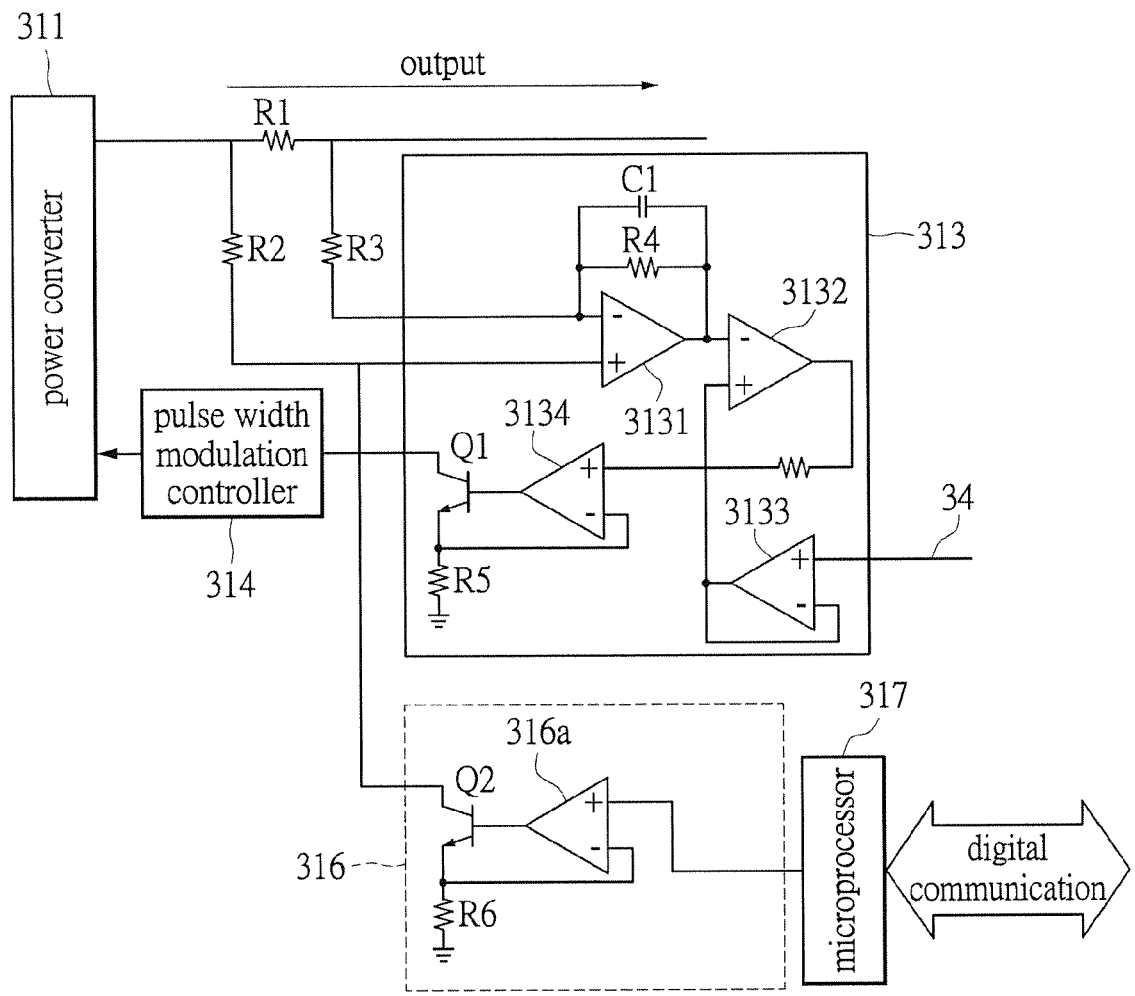
FIG. 3 is a circuit diagram illustrating a backup power supplying device having programmable current-balancing control in an embodiment of the present disclosure.

Referring to FIG. 2A and FIG. 3, FIG. 3 shows a current-balancing control circuit and a potential tuner in an embodiment of the present disclosure. The power converter 311 in FIG. 3 and the power converter 211 in FIG. 2A are the same. The pulse width modulation controller 314 in FIG. 3 is one of the implementations of the output voltage controller 214 in FIG. 2A, but is not limited to in the present disclosure. The output voltage controller 214 of the present disclosure can be a pulse width modulation controller or a linear voltage modulation controller. The power converter 211 can be an AC/DC power module or a DC/DC power module. The current provided to the load 13 is DC and the pulse width modulation controller 314 is a commonly used controller for a person skilled in the art, and thus will not be further described hereinafter. The current-balancing control circuit 313 in FIG. 3 is one of the implementations of the current-balancing control circuit 213 in FIG. 2A. This implementation is merely taken as an example for illustration and is not limited to in the present disclosure.

Re-referring to FIG. 3, the current-balancing control circuit 313 comprises amplifiers 3131, 3132, 3133, 3134, a transistor Q1, a capacitor C1, and resistors R4, R5. The current sensing component 212 in FIG. 2 is composed of, but not limited to, resistors R1, R2 and R3 in the present disclosure. The integrator is composed of the amplifier 3131, the capacitor C1 and the resistor R4. The integrator integrates the current passing through the resistor R1 and transmits the integrated current signal (in voltage form) to the inverting input end (−) of the amplifier 3132. The inverting input end (−) of the amplifier 3133 is coupled to the output end to form a unit gain follower. The amplifier 3133 transmits the current-balancing signal on the current-balancing communicating wire 34 to the non-inverting input end (+) of the amplifier 3132. The amplifier 3132 shown in FIG. 3 forms a comparator circuit structure which compares the integrated current signal with the current-balancing signal. The compared result is transmitted to the non-inverting input end (+) of the amplifier 3134. The inverting input end (−) of the amplifier 3134 is coupled to the ground via the resistor R5. The output end of the amplifier 3134 is coupled to the control end (base) of the transistor Q1 to control the conducting state (ON/OFF) of the transistor Q1. The transistor Q1 is coupled between the pulse width modulation controller 314 and the resistor R5 (by coupling the emitter to the resistor R5 and coupling the drain to the pulse width modulation controller 314). The amplifier 3134 controls ON and OFF of the transistor Q1 according to the compared result of the amplifier 3132 so as to generate the voltage control signal SV for tuning the pulse width generated from the pulse width modulation controller 314. For example, when the integrated current signal representing the current passing through the resistor R1 is less than the current-balancing signal from the current-balancing communicating wire 34, the transistor Q1 is ON. The pulse width modulation controller 314 can increase the pulse width accordingly to increase the output voltage and current of the power convertor 311. When the integrated current signal representing the current passing through the resistor R1 greater than the current-balancing signal from the current-balancing communicating wire 34, the transistor Q1 is OFF. The pulse width modulation controller 314 can decrease the pulse width accordingly to decrease the output voltage and current of the power convertor 311.

Re-referring to FIG. 3, the potential tuner 316 tunes the potential of the non-inverting input end (+) of the amplifier 3131 according to the control from the microprocessor 317. The potential tuner 316 comprises an amplifier 316a, a resistor R6 and a transistor Q2. The microprocessor 317 controls the resistance value the potential tuner 316 views from the current-balancing control circuit 313 (the resistance value of the drain of the transistor Q2) according to the signal from the digital communication (e.g., the signal from the I²C-Bus). The drain of the transistor Q2 is coupled to the resistor R2 and the non-inverting input end (+) of the amplifier 3131. The potential of the non-inverting input end (+) of the amplifier 3131 can be changed by the variant resistance value of the potential tuner 316 so as to change the current signal integrated by the amplifier 3131, and thus the pulse width of the pulse width modulation controller 314 can be tuned accordingly. The potential of the connecting point between the potential tuner 316 and the current-balancing control circuit 313 represents the tuning signal SA in FIG. 2. However, the implementation of the potential tuner 316 is not intended to limit the scope of the present disclosure. The potential tuner 316 may comprises a variable resistance component. The microprocessor 317 may control the resistance value of the variable resistance component. The above mentioned amplifier 316a, resistor R6 and transistor Q2 may equivalent to the variable resistance component.

Re-referring to FIG. 2, the output current of the power module can be changed by the tuning signal SA generated from the tuning circuit 216 so that the output current ratio of the power modules 21 and 22 can be different. For example, the output current ration of the power modules 21 and 22 can be 40%:60% or 70%:30% or even can be the complete backup state of 100%:0% that the power module 22 does not output current and the power module 22 is the backup power module.

Figure 4:
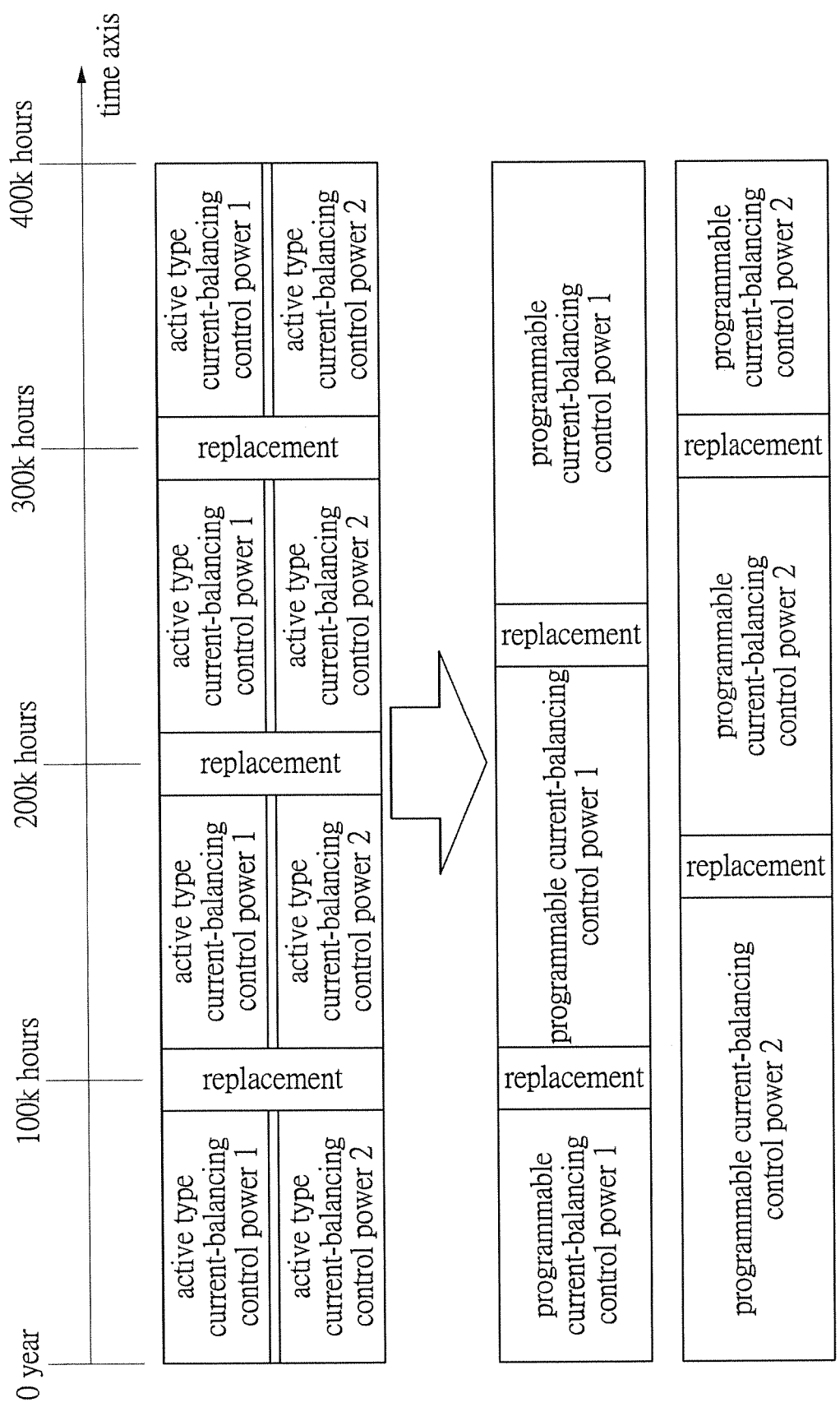
FIG. 4 is a schematic diagram illustrating the replacing time interval of the power module in an embodiment of the present disclosure.

Referring to FIG. 4, FIG. 4 is a schematic diagram illustrating the replacing time interval of the power module in an embodiment of the present disclosure. By tuning of the tuning circuit 216 in FIG. 2A, the life time of the power modules may be easily expected and the replacing rate of the power modules may also be estimated. In the conventional active type current-balancing power supplying device, since the output power ratio of the power modules (the active type current-balancing control power 1 or the active type current-balancing control power 2) are equal, it may likely cause the replacement for all power modules at the same time. For example, at the power replacing time point of 100 k hours, 200 k hours, 300 k hours and 400 k hours, since the power modules would fail easily after the expected life time, all power modules have to be replaced at the same time point to avoid the possibility of failure of any one of the power modules. However, the programmable current-balancing control power (i.e., the power supplying device having programmable current-balancing control) can tune the expected life time of each power module by the power providing ratio of each power module. The power module with low power providing rate may has longer expected life time. The power module with high power providing rate may has shorter expected life time. Accordingly, the expected lift time of each power module can be different and the replacing time of the power modules may also be estimated. In FIG. 4, within the 400 k hours using period, the total using amount of the programmable current-balancing control power 1 and the programmable current-balancing control power 2 is six and the total using amount of the conventional active type current-balancing control power 1 and 2 is eight. Therefore, in using amount of the power modules, the amount of the power modules needing to be replaced can be reduced in the present disclosure. The expected life time of each power module expires at different time in the present disclosure so as to avoid the possibility that the conventional active type current-balancing control powers will fail at the same time.

Figure 5:
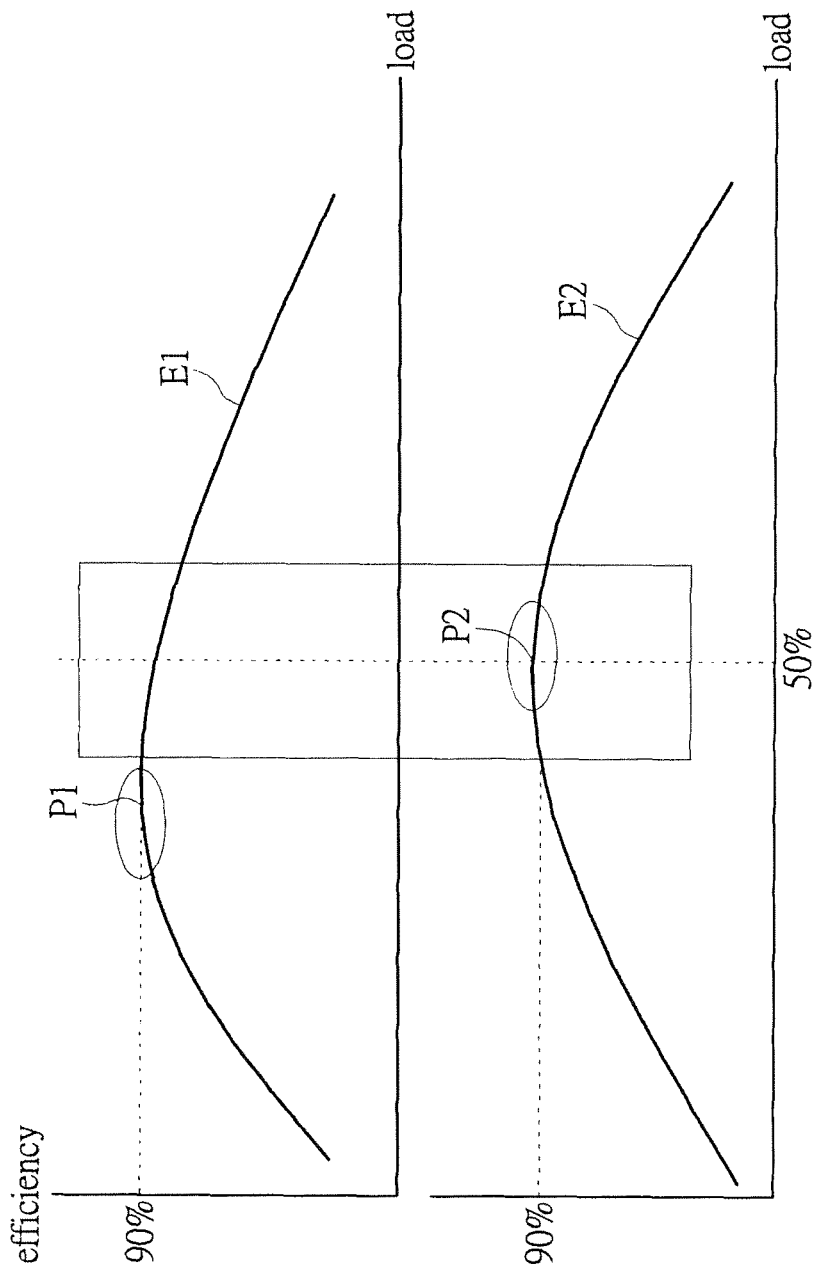
FIG. 5 is a schematic diagram illustrating the converting efficiency of the power module of a conventional active type current-balancing power supplying device.

Referring to FIG. 5, FIG. 5 is a schematic diagram illustrating the converting efficiency of the power module of a conventional active type current-balancing power supplying device. Each power module of the conventional active type current-balancing power supplying device operates at the same output current. Thus the power modules with different converting efficiency may operate at different converting rate when they operate at the same output current. The most efficient point P1 and P2 of the converting efficiency curve E1 and E2 are not at the same output current (or load ratio). The current-balancing control circuit of each power module controls the output current of each power module to be identical. As illustrated in FIG. 5 that the output current ratio (i.e., load ratio) is 50%:50%.

Figure 6:
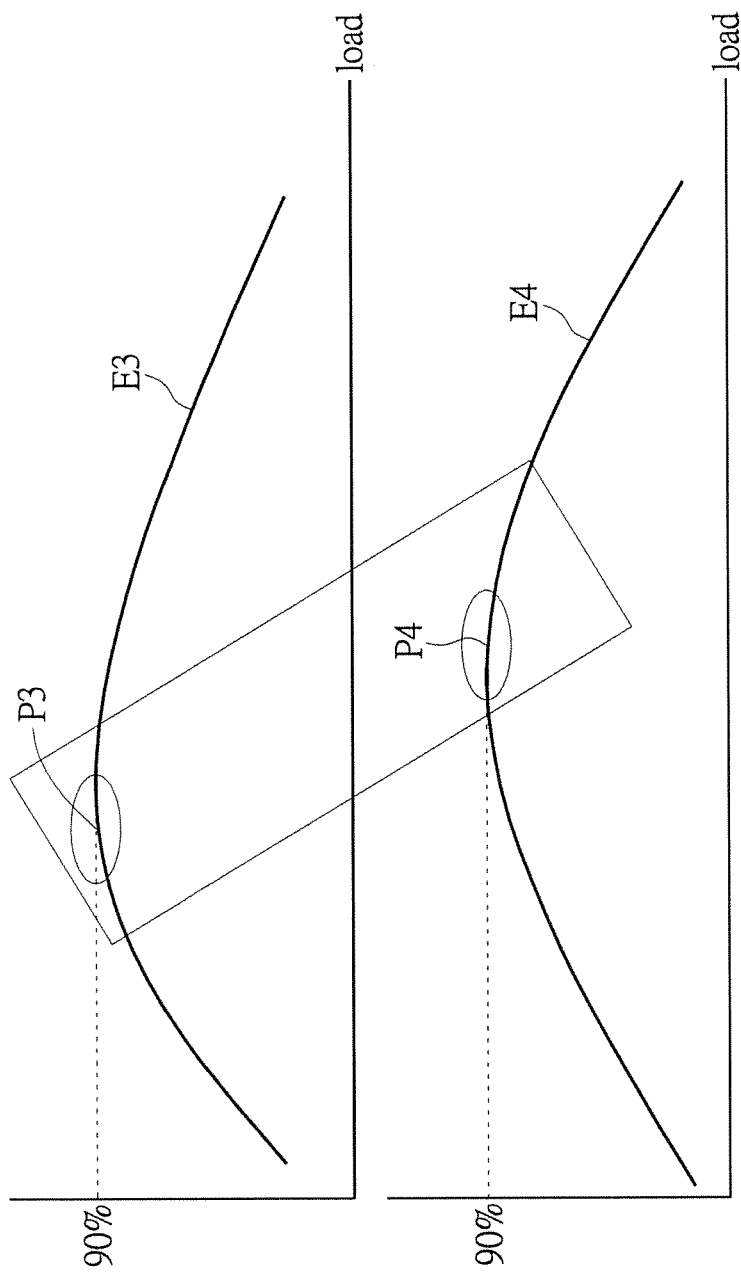
FIG. 6 is a schematic diagram illustrating the converting efficiency of the power module of a backup power supplying device having programmable current-balancing control in an embodiment of the present disclosure.

Referring to FIG. 6, FIG. 6 is a schematic diagram illustrating the converting efficiency of the power module of a power supplying device having programmable current-balancing control in an embodiment of the present disclosure. The load ratio of the power modules in the present disclosure is tunable. For example, the load ratio can be tuned to 40%: 60% so that the two power modules can operate at the most efficient point P3 and P4 of the converting efficiency curve E3 and E4 respectively.

To sum up the above description, in the present disclosure, the backup power supplying device having programmable current-balancing control controls the power modules to operate in the power supply mode or the sleep mode according to the mode signal received by the microprocessor, in which the voltage level of the sleep voltage is lower than the voltage level of the power supply mode by a predetermined voltage value. The predetermined voltage value can be set within a voltage difference range of a tolerable working voltage for the load, by which the sleep voltage of the power module which is in the sleep mode will not interrupt the work of the load when the power module is abnormal or does not supply power. In addition, by means of the tuning mechanism of the current-balancing control circuit, the output voltage of the power module which is in the sleep mode will rapidly increase from the sleep voltage to the normal power supply voltage. For the load end, the backup power supplying device having programmable current-balancing control can achieve an effect of zero time switch.

The above-mentioned descriptions represent merely the exemplary embodiment of the present disclosure, without any intention to limit the scope of the present disclosure thereto.

What is claimed is:

1. A backup power supplying device having programmable current-balancing control, comprising:
    at least two power modules; the power modules connected in parallel output power to a load; each of the power modules operates in a power supply mode or a sleep mode; each of the power module comprises:
        a power converter, having an output end; the power converter provides power to the load via the output end;
        a current sensing component, coupled to the output end of the power converter, sensing an output current of the power converter to generate a current sensing signal;
        a potential tuner, generating a tuning signal;
        a microprocessor, coupled to the potential tuner; the microprocessor controls the potential tuner to generate the tuning signal; the microprocessor receives a mode signal to controls the power module to operate in the power supply mode or the sleep mode;
        a current-balancing control circuit, coupled to the current sensing component and the potential tuner, receiving the current sensing signal, the tuning signal and the mode signal, wherein the current-balancing control circuit generates a current-balancing signal according to the current sensing signal when the current-balancing control circuit does not receive the tuning signal; the current-balancing control circuit generates a voltage-control signal according to the tuning signal when the current-balancing control circuit receives the tuning signal; and
        an output voltage controller, coupled to the current-balancing control circuit, wherein the output voltage controller tunes an output voltage of the power converter to a supply voltage according to the current-balancing signal or the voltage control signal when the power module operates in the power supply mode, wherein the current-balancing control circuit controls the output voltage of the power converter to a sleep voltage according to the mode signal via the output voltage controller when the power module operates in the sleep supply mode; a voltage level of the sleep voltage is lower than a voltage level of the supply voltage by a predetermined voltage value;
    wherein the current-balancing control circuit of each power module is coupled to each other via a current-balancing communicating wire; the microprocessor of each power module is coupled to each other via a backup-mode communicating wire.

2. The backup power supplying device having programmable current-balancing control according to claim 1, wherein the mode signal received by the microprocessor is a control command from a communication port or an error signal from the backup-mode communicating wire.

3. The backup power supplying device having programmable current-balancing control according to claim 1, wherein the power module further comprises:
    a voltage determining component, coupled to an input power source and the microprocessor; the input power source is the source to be provided to the power converter to convert power; the voltage determining component generates the mode signal according to the input power source.

4. The backup power supplying device having programmable current-balancing control according to claim 3, wherein the input power source is an AC power source or a DC power source, the power module is an AC/DC power module or a DC/DC power module.

5. The backup power supplying device having programmable current-balancing control according to claim 3, wherein the input power source is from a battery.

6. The backup power supplying device having programmable current-balancing control according to claim 1, wherein the communication port is an Inter-Integrated Circuit Bus ($I^2$C-Bus) or a Power Management Bus (PMBus).

7. The backup power supplying device having programmable current-balancing control according to claim 1, further comprising:
    a switch, coupled between the current sensing component and the load.

8. The backup power supplying device having programmable current-balancing control according to claim 1, wherein the output voltage controller is a pulse width modulation controller or a linear voltage modulation controller.

9. The backup power supplying device having programmable current-balancing control according to claim 1, wherein the potential tuner comprises a variable resistance component.

10. The backup power supplying device having programmable current-balancing control according to claim 1, wherein load ratio of the power modules is tunable.

* * * * *